United States Patent
Kumamoto

Patent Number: 5,416,852
Date of Patent: May 16, 1995

[54] PATTERN PROCESSING SYSTEM AND METHOD

[75] Inventor: Etsuko Kumamoto, Nishinomiya, Japan

[73] Assignee: Fuji Xerox Co., Ltd., Japan

[21] Appl. No.: 110,811

[22] Filed: Aug. 23, 1993

Related U.S. Application Data

[63] Continuation of Ser. No. 747,990, Aug. 21, 1991.

[30] Foreign Application Priority Data

Aug. 24, 1990 [JP] Japan ................. 2-223498

[51] Int. Cl.⁶ ............................... G06K 9/40
[52] U.S. Cl. ............................ 382/199; 382/254; 395/151
[58] Field of Search ............ 382/22, 54, 47; 395/151; 345/143, 144

[56] References Cited

U.S. PATENT DOCUMENTS

| | | | |
|---|---|---|---|
| 4,933,866 | 6/1990 | Markoff et al. | 345/143 |
| 4,959,801 | 9/1990 | Apley et al. | 345/144 |
| 5,003,304 | 3/1991 | Takinomi et al. | 340/801 |
| 5,050,103 | 9/1991 | Schiller et al. | 395/151 |
| 5,068,803 | 11/1991 | Valdes et al. | 395/150 |
| 5,241,653 | 8/1993 | Collins et al. | 395/151 |
| 5,257,016 | 10/1993 | Fujii et al. | 345/143 |

Primary Examiner—Leo H. Boudreau
Assistant Examiner—Chris Kelley
Attorney, Agent, or Firm—Welsh & Katz, Ltd.

[57] ABSTRACT

A pattern processing system which comprises a main memory (3) and an outline data extractor (4) and a stroke setter (5). The outline data extractor (4) extracts a plurality of pairs of opposing segments on an outline of a pattern, obtain a position of a segment in one side of the segments in each pair, and also obtains a width between the segments in each pair on the basis of outline font data stored in the main memory (3). The stroke setter (5), when the obtained widths between the segments in the pairs are equal to each other, calculates an average distance between the segments on the basis of the positions of segments in one side in the pairs, selects one of the positions of the segments in one side and using a selected position as a reference position, corrects the remaining positions of the segments in one side other than the selected position on the basis of the average distance and the reference position and obtaining respective correction positions therefor, and adds the width to the reference position of the segments in one side and the correction positions to thereby obtain correction positions of the segments in another side in the pairs of segments.

8 Claims, 5 Drawing Sheets

PATTERN PROCESSING SYSTEM AND METHOD

This is a continuation application of Ser. No. 07/747,990, filed Aug. 21, 1991.

BACKGROUND OF THE INVENTION

1. Field of the Invention

The present invention relates to a pattern processing system which corrects an outline of a pattern indicative of a character, a symbol etc. to perform reducing operation over the outline, and a method therefor.

2. Description of the Prior Art

As known, in desk top publishing (electronic publishing by personal computers), an outline font system is becoming a commonly adopted system in which a pattern of a character, a symbol, etc. is generated based on an outline font data. In the outline font system, the coordinates of a plurality of control points located on the outline of a pattern are held as data, and when it is desired to develop the pattern on a bit map, straight lines and/or curves passing through these control coordinate points are generated to form the outline and then fill dots in the inside area of the outline. According to this system, when enlarging or reducing a pattern, first the outline of the pattern is enlarged or reduced and then it is converted to a dot pattern. This is advantageous over a method for directly performing enlargement or reduction processing to the dot pattern in that this system causes less deterioration in the quality of the resultant character.

Figure 10:
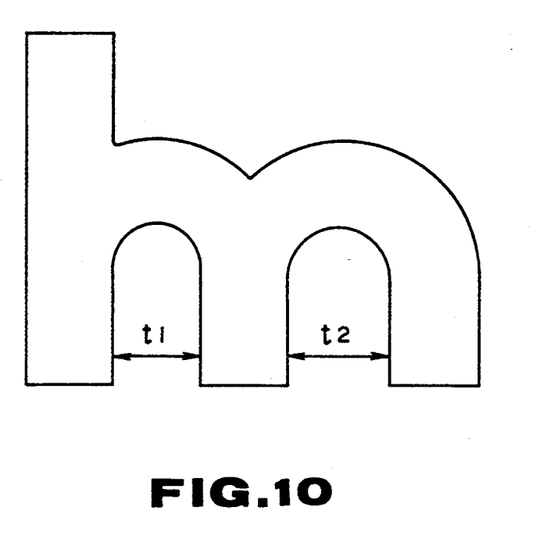
FIG. 10 is an example of outline of a pattern.
Figure 11:
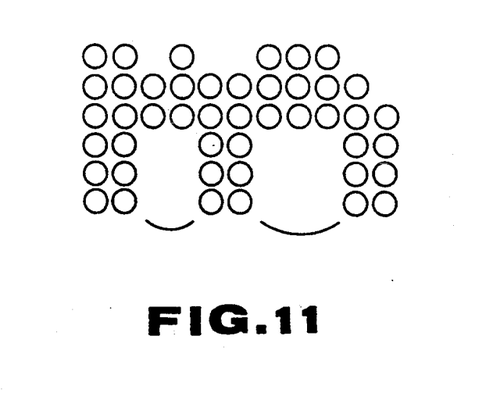
FIG. 11 shows a dot pattern formed by reducing the outline of FIG. 10 and developing it on a bit map.

When an outline of a character is subjected to a reduction, it is not always preferable to reduce every portions of the outline proportionally. For example, when it is desired to reduce the outline of a pattern as shown in FIG. 10, two spacings t1 and t2 in the outline are originally different from each other. In the reduced outline, however, it is preferable to make the two spacings to be equal to each other because the pattern reduced in that manner, when developed on a bit map, can easily hold its quality. The pattern reduced in that manner can avoid such a situation as shown in FIG. 11 in which the slight difference between the spacings t1 and t2 is expressed in a difference of one picture element on the bit map. The reduced pattern in FIG. 11 is largely changed when compared with the original pattern. In conventional systems, however, the above-described correction processing to make equal the spacings in the reduced outline is not performed. Accordingly, the quality of a character may sometimes deteriorated when the character is reduced.

Laid-Open Publication No. 1-303489 of Japanese Patent Application proposes a character output system for solving a problem caused by a character pattern having unequal line widths. In this system, it is determined that each pair of opposing segments on the outline of a character pattern comprises a reference segment and a segment to be corrected and distance between the opposing segments in each pair is determined to be a reference width. When reducing the character pattern, the position of the reference segment is determined by reducing it and making it an integer value, while the position of the segment to be corrected is determined firstly by reducing its reference width and making it an integer value and then by positioning the segment to be corrected spaced from the position obtained based on the reference segment by the integer value obtained based on the reference width.

The character output system of the Laid-Open Publication can avoid a situation in which spacings between the opposing segments in each pair become unequal by the reduction processing of the pairs of segments. However, although the system can solve a problem that each pair of segments has unequal line width in a reduced character pattern, the system cannot perform such a correction for making uniform spacings between adjacent pairs of segments in an outline as shown in FIG. 10.

SUMMARY OF THE INVENTION

It is therefore an object of the present invention to provide a pattern processing system and method of processing a pattern which can make uniform spacings between adjacent pairs of segments in an outline of a pattern.

In accordance with an aspect of the present invention, the above object is attained by a pattern processing system wherein an outline of a pattern to be processed includes a plurality of pairs of segments, comprising a data extraction unit for obtaining a position of a segment in one side in each of the pairs of segments and obtaining a width between the segments in said each of the pairs of segments; and a calculation unit, when widths between the segments obtained for the pairs are equal to each other, for calculating an average distance between segments in one side on the basis of positions of segments obtained for each of the pairs, for selecting one of the positions of said segments in one side so as to use the selected one of the positions as a reference position, for correcting positions of said segments in one side other than the selected one of the positions on the basis of said average distance and said reference position so as to obtain respective corrected positions therefor, and for adding said width to said reference position and said corrected positions of the segments in one side so as to obtain corrected positions of segments in another side in each of the pairs of segments.

In the present invention, the positions of segments in one side of the segments for each pair are corrected to be one reference position and corrected positions respectively spaced by the average from the reference position. The positions of the segments in another side of the segments for each pair are corrected by adding the width to the reference position and the corrected positions, respectively. As a result of the correction, distance from one pair of segments to the adjacent pair of segments is equal to the average distance from which the width is subtracted.

DETAILED DESCRIPTION OF THE EMBODIMENTS

Explanation will first be directed to the basic principle of the present invention with reference to FIGS. 4 to 7.

Figure 4:
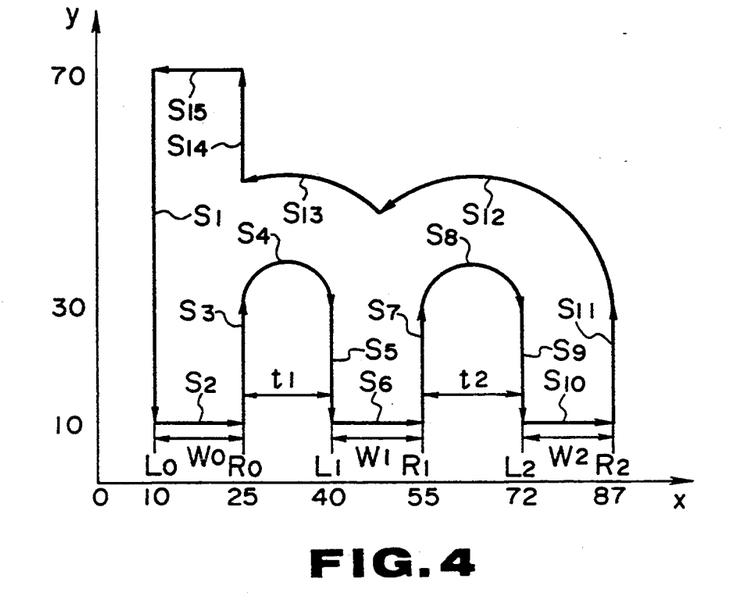
FIG. 4 shows an outline of a pattern before correction drawn in a two-dimensional coordinate system.

Referring first to FIG. 4, there is shown an example of an outline drawn in a two-dimensional coordinate system, which outline comprises segments S1 to S15. An outline font data indicative of the outline is created by sequentially tracing the control coordinate points of the segments S1 to S15 in a counterclockwise direction, that is, in the order of the control coordinate points (10, 70), (10, 10), (25, 10), . . . (25, 70), and again (10, 70). With regard to a curve, the curve requires at least three control coordinate points, i.e., start, intermediate and end coordinate points.

Of the segments S1 to S15, vertical ones are selected and then judged whether to be directed upward or downward. Take the segment S1 having two control coordinate points (10, 70) and (10, 10) for example. Since these control coordinate points have the same value '10' with respect to X axis, it is judged that the segment S1 is vertical. Further, since values in these control coordinate points with respect to Y axis are decreased from '70' to '10', the segment S1 is judged to be directed downward. With regard to the segment S2, since the segment S2 has two control coordinate points (10, 10) and (25, 10) and the control coordinate points have different values '10' and '25' with respect to X axis, the segment S2 is judged not to be vertical. With regard to the segment S3, since the segment S3 has two control coordinate points (25, 10) and (25, 30) and the control coordinate points have the same value '25' with respect to X axis, the segment S3 is judged to be vertical. In addition, since values in the control coordinate points (25, 10) and (25, 30) with respect to Y axis are increased from '10' to '30', the segment S3 is determined to be directed upward. Similarly, the subsequent segments are sequentially judged whether or not to be vertical and if judged to be vertical, then judged whether to be directed upward or downward.

Through the above operation, the segments S1, S5 and S9 are determined to be vertical and directed downward while the segments S3, S7 and S11 are determined to be vertical and directed upward. In this case, the first downward segment S1 and the second upward segment S3, the third downward segment S5 and the fourth upward segment S7, and the fifth downward segment S9 and the sixth upward segment S11 form respectively a pair of opposing segments. In each of such pairs of opposing segments, the downward segment is on the left side of each pair and the upward segment is on the right side thereof. In this specification, a band region parallel to Y axis and defined by such a pair of opposing segments is referred to as one stroke.

Next, the values '10', '40' and '72' in the control coordinate points of the left-side segments S1, S5 and S9 with respect to X axis are obtained as positions L0, L1 and L2 of the segments, respectively. Further, the values '25', '55' and '87' in the control coordinate points of the right-side segments S3, S7 and S11 with respect to X axis are obtained as positions R0, R1 and R2 respectively. The difference between the position L0 of the left-side segment S1 and the position R0 of the right-side segment S3 is obtained as a width W0 for its stroke; the difference between the position L1 of the left-side segment S5 and the position R1 of the right-side segment S7 is obtained as a width W1 for its stroke, and the difference between the position L2 of the left-side segment S9 and the position R2 of the right-side segment S11 is obtained as a width W2 for its stroke, respectively.

Judgment is then made as to whether three or more pairs of opposing segments are present or not. When three or more pairs of opposing segments are present, this means that two or more spacings between one right-side segment and the next adjacent left-side segment are present. Thus it is valid to perform such processing as to uniform two or more such spacings. In the illustrated example, since there are three pairs of opposing segments, there are two spacings, that is, a spacing t1 between the right-side segment S3 and the left-side segment S5 and a spacing t2 between the right-side segment S7 and the left-side segment S9, so that it is valid to uniform such spacings t1 and t2.

Judgment is next made as to whether or not the widths W0, W1 and W2 of the respective strokes are equal to each other as shown by the following equation (1).

$$W = W0 = W1 = W2 \tag{1}$$

In the case where a relation $10 = W0 = W1 = W2$ is satisfied and the widths of the respective strokes are judged to be equal to each other, the aforementioned spacing uniforming operation is carried out with respect to the spacings t1 and t2, as follows.

That is, an average K of a distance from the left-side segment S1 to the left-side segment S5 and a distance from the left-side segment S5 to the left-side segment S9 is calculated in accordance with the following equation (2).

$$K = (L2 - L0)/n \tag{2}$$

where n = (number of strokes) − 1

In the illustrated example, an average distance K is obtained as $(72 - 10)/2 = 31$.

Leftmost one (i.e., left-side segment S1) of the left-side segments S1, S5 and S9 is then selected and a corrected position L0' for the position L0 of the selected left-side segment S1 is calculated in accordance with the following equation (3).

$$L0' - L0 \tag{3}$$

In the illustrated example, the corrected position L0' is obtained as 10.

A corrected position L1' for the second left-side segment S5 is obtained in accordance with the following equation (4), that is, by adding the average distance K to the corrected position L0' as a reference.

$$L1' = L0' + k \tag{4}$$

In this example, the corrected position L1' is obtained as 41 (= 10 + 31).

Further, a corrected position L2' for the third left-side segment S9 is obtained in accordance with the following equation (5), that is, by adding twice the average distance K to the corrected position L0'

$$L2' = L0' + 2K \tag{5}$$

In this example, the corrected position L2' is obtained as 72 (=10+2×31).

Next, correction positions R0', R1' and R2' for the right-side segments S3, S7 and S11 are obtained in accordance with the following equations (6), (7) and (8), that is, by adding the width W to the correction positions L0', L1' and L2', respectively.

$$R0' = L0' + W \quad (6)$$

$$R1'L1' + W \quad (7)$$

$$R'2 = L2' + W \quad (8)$$

In the illustrated example, the correction positions R0', R1' and R2' are obtained as 25 (=10+15), 56 (=41+15) and 87 (=72+15), respectively.

Figure 5:
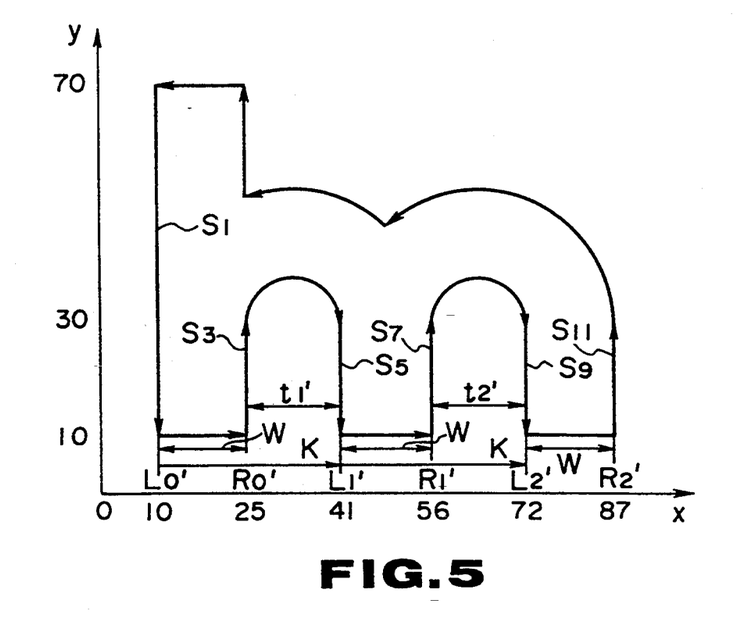
FIG. 5 shows an outline of the pattern after the correction drawn in the two-dimensional coordinate system.

Shown in FIG. 5 is an outline when the above segments are rearranged based on the thus-obtained correction positions, that is, the correction positions L0' (=10), L1' (=41) and L2' (=72) of the left-side segments S1, S5 and S9 as well as the correction positions R0' (=25), R1' (=56) and R2' (=87) of the right-side segments S3, S7 and S11.

Now comparison will be made between FIGS. 4 and 5. In FIG. 4, since the distance t1 between the right-side and left-side segments S3 and S5 is '15' and the distance t2 between the right-side and left-side segments S7 and S9 is '17', the distance t1 is not equal to the distance t2 with a difference of '2' therebetween. In FIG. 5, on the other hand, since the distance t1' between the right-side and left-side segments S3 and S5 is '16' and the distance t2' between the right-side and left-side segments S7 and S9 is '16', the distance t1' is equal to the distance t2'. In other words, the distance between the right-side and left-side segments S3 and S5 and the distance between the right-side and left-side segments S7 and S9 have been uniformed or made equal to each other.

Meanwhile, such uniforming operation of the distance between strokes requires correction of the control coordinate points of the segments S1 to S15. The correction of the control coordinate points is carried out according to three methods (A), (B) and (C) which follow.

Figure 6:
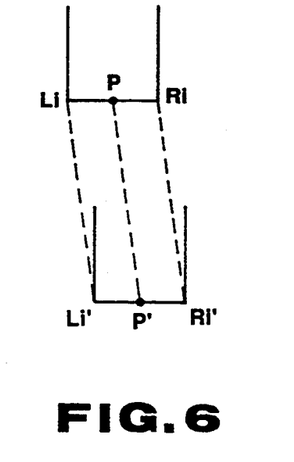
FIGS. 6 and 7 are diagrams for explaining the correcting operation of control points on outlines respectively.

(A) When a control coordinate point is located within a stroke:

When a control coordinate point or position P is located inside a stroke, that is, located between the position Li of a left-side segment and the position Ri of a right-side segment which form a pair of opposing segments as shown in FIG. 6, a corrected position P' for the control coordinate position P is calculated in accordance with the following equation (9).

$$P' = P + (Li' - Li) \quad (9)$$

where Li' denotes a corrected position for the left-side segment.

In other words, the corrected position P' is obtained by moving the control coordinate position P by a movement distance in the left-side segment.

Figure 7:
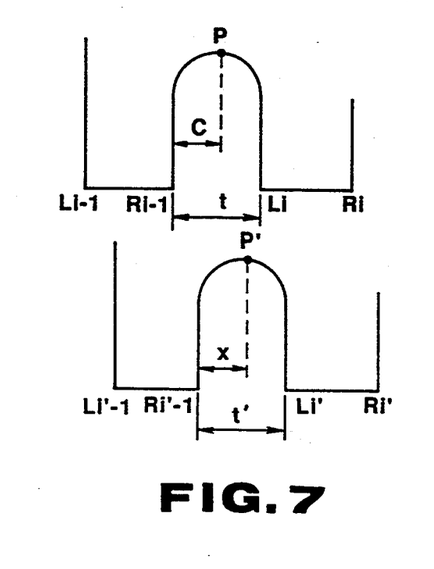

(B) When a control coordinate point is located between two strokes:

When the control coordinate position P is located between a position Ri-1 of the right-side segment of one stroke and the position Li of the left-side segment of the other stroke as shown in FIG. 7, a distance C from the position Ri-1 of the right-side segment and the position P of the control coordinate point is obtained and then a corrected distance X is calculated in accordance with the following equation (10). And a corrected position P' for the control coordinate point is set to be spaced by the corrected distance X from a corrected position Ri-1' of the right-side segment.

$$X = C \times t/t' \quad (10)$$

where, t denotes a distance between strokes before correction and t' denotes a distance between the strokes after the correction.

In other words, the corrected position P' is obtained by moving the position P of the control coordinate point according to a ratio of the distance t between the strokes before correction and the distance t' between the strokes after the correction.

(C) When a control coordinate point is located outside ones of all the strokes positioned at the both sides:

When the position P of the control coordinate point is located outside of the left-side segment of the left-side stroke and on its left side, the corrected position P' is obtained by moving the position P of the control coordinate point by a movement distance in the left-side segment. When the position P is located outside of the right-side segment of the right-side stroke and on its right side, on the other hand, the corrected position P' is obtained by moving the position P by a movement distance in the right-side segment.

When all the control coordinate points of the outline are corrected and an outline is recreated based on the corrected control coordinate points in this way, such a corrected outline as shown in FIG. 5 can be obtained. Since the distances between the strokes in the corrected outline are made uniform as already explained above, when such a corrected outline is subjected to a reduction processing, distances between strokes in the reduced outline are also uniform, as a matter of course.

Although the foregoing explanation has been made in connection with only the vertically-directed strokes, distances between horizontally-directed strokes can be corrected in substantially the same manner as in the vertically-directed strokes. In the latter case, more specifically, ones of the segments S1 to S15 directed horizontally are selected and the selected segments are paired to form pairs of opposing lower-side and upper-side segments, so that, in the event where there are three or more strokes which are defined by such pairs of lower-side and upper-side segments and the strokes have the same width, calculation is carried out with respect to the horizontal direction in accordance with the above equations (2) to (8) to correct the positions of the horizontal segments. Thereafter, the positions of the control coordinate points are corrected with respect to the horizontal direction based on the above methods (A) to (C) to thereby obtain an outline horizontally corrected.

Figure 8:
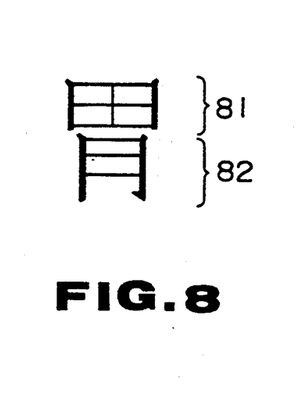
FIGS. 8 and 9 show examples of the outlines of complex patterns respectively.
Figure 9:
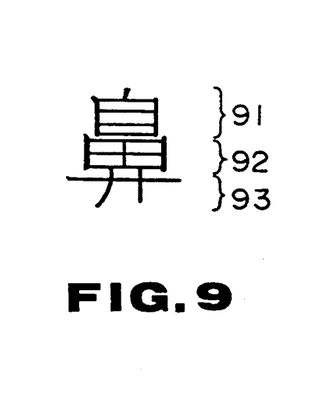

When it is desired to perform its correcting operation not over such a simple outline pattern as shown in FIG. 4 but over such a relatively complex outline pattern as shown in FIGS 8 and 9, the outline is first divided into a plurality of outline parts and the correcting operation is applied to each of the divided outline parts. In more detail, such an outline pattern as shown in FIG. 8 is previously divided into two outline parts 81 and 82, and the aforementioned uniforming operation of interstroke distances is carried out for each of these outline parts 81 and 82 to correct the positions of respective control coordinate points. Similarly, such an outline pattern as shown in FIG. 9 is previously divided into three outline Darts 91, 92 and 93, and the correcting operation is carried out for each of these outline parts 91, 92 and 93. Since this method can avoid the forced uniformance of inter-stroke distances in the entire outline, there can be realized such a character pattern that is easy to observe with good balance.

Figure 1:
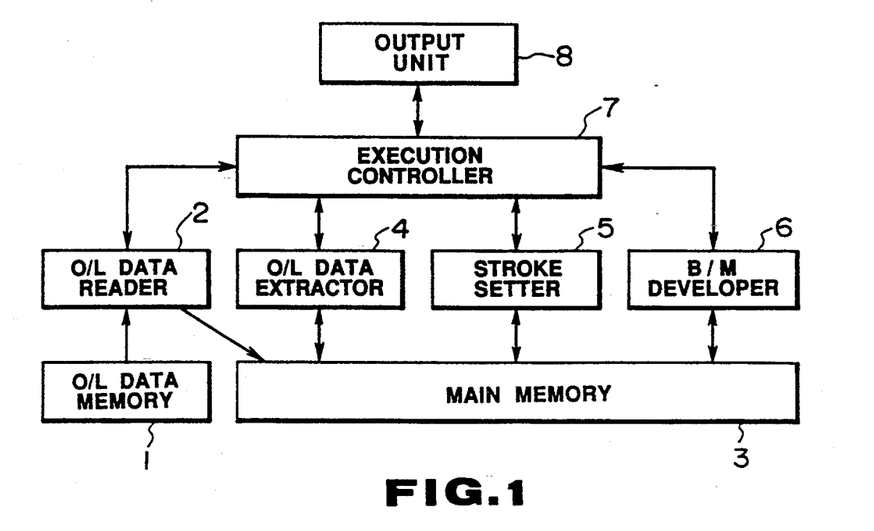
FIG. 1 is a functional block diagram of a pattern processing system in accordance with an embodiment of the present invention.

FIG. 1 shows a functional block diagram of a pattern processing system in accordance with an embodiment of the present invention. In the drawing, outline font data indicative of an outline are stored in an outline data memory 1. An outline data reader 2 reads out the outline font data from the outline data memory 1 and sends it to the main memory 3 to be stored therein. An outline data extractor 4 is provided to extract, on the basis of the outline font data stored in the main memory 3, the position of a pair of opposing segments constituting each of stokes in the outline. A stroke setter 5 calculates the aforementioned equations (1) to (8) to obtain correction positions for each pair of opposing segments with respect to each stroke.

Further, a bit map developer 6 rearranges the control coordinate points of the outline according to the above methods (A) to (C) to obtain a corrected outline, reduces the corrected outline to form a reduced outline, and develops the reduced outline on a bit map built in the main memory 3 to form a reduced pattern. The thus-obtained reduction pattern is transferred from the main memory 3 through the bit map developer 6 and an execution controller 7 to an output unit 8 where the pattern is recorded or displayed. The execution controller 7 acts to perform general control over the outline data reader 2, outline data extractor 4, stroke setter 5, bit map developer 6 and output unit 8 to advance a series of processing.

Figure 2:
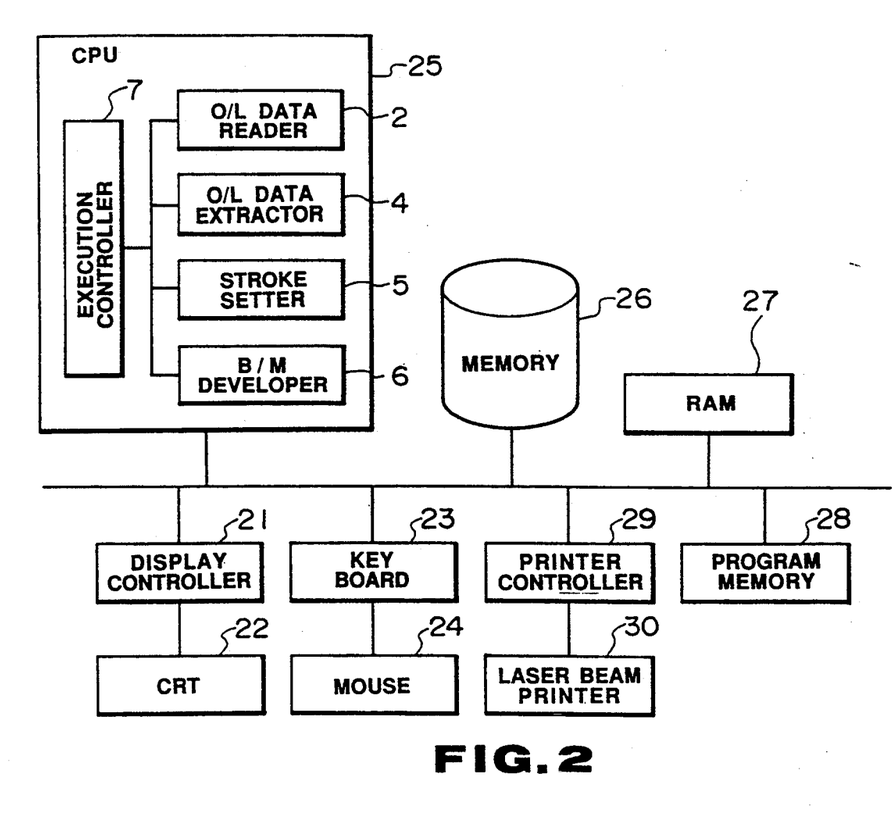
FIG. 2 is a block diagram of a system to which the embodiment of FIG. 1 is applied.

Referring to FIG. 2, there is shown a block diagram of a system embodying the embodiment of FIG. 1, wherein a display controller 21 corresponding to the output unit 8 of FIG. 1 is connected to a CRT 22 in the form of a graphic display to control the visual display of various sorts of data. A keyboard 23, which is used to enter various data necessary for the operation of the system, is connected to a mouse 24 in the form of a pointing device. An operator may also enter data necessary for printing, etc. directly through the keyboard 23.

The system of FIG. 2 also includes a CPU 25 which corresponds to the execution controller 7, outline data reader 2, outline data extractor 4, stroke setter 5 and bit map developer 6 in FIG. 1 and which acts to perform general control over the system of FIG. 2. An external memory 26, which corresponds to the outline data memory 1 in FIG. 1, stores therein outline font data indicative of an outline in the form of a font file and also stores, as necessary, preservative data. A RAM 27, which corresponds to the main memory 3 in FIG. 1, is used not only as a storage area for temporarily storing the outline font data or as a work area for processing the outline, but also to temporarily store a program for causing the operation of the system or temporarily store various sorts of data therein. A program memory 28 stores therein a control program for execution of various functions in the system. A printer controller 29, which corresponds to the output unit 8 in FIG. 1, performs printing control over a laser beam printer 30 to record various sorts of data on a recording paper.

Figure 3:
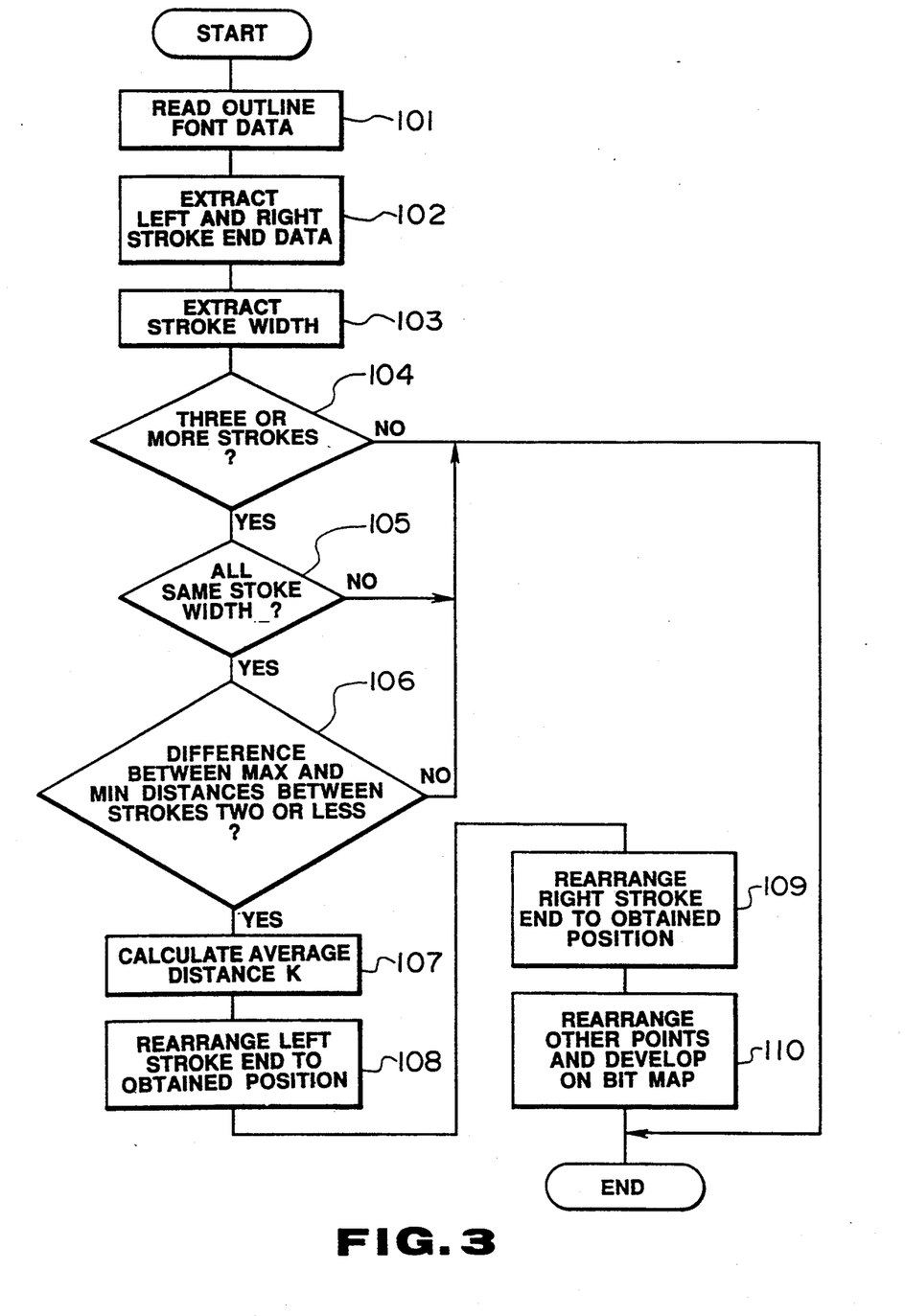
FIG. 3 is a flowchart for explaining the processing procedure of the embodiment of FIG. 1.

With such an arrangement, explanation will be made as to the uniforming operation of inter-stroke distances in an outline, by referring to FIG. 3. First, the outline data reader 2 reads out an outline font data from the outline data memory 1 and sends it to the main memory 3 to be stored therein (step 101). The outline data extractor 4, on the basis of the outline font data stored in the main memory 3, extracts the positions of a pair of opposing segments of each stroke (step 102) and obtains the width of each stroke (step 103). Then the stroke setter 5 judges whether or not three or more strokes are present (step 104). The stroke setter 5, when determining the presence of 3 or more strokes (YES in the step 104), sets the valid processing for uniforming two or more spacings because two or more spacings exist between the strokes.

Subsequently, the stroke setter 5 judges whether or not the strokes have the same width in accordance with the above equation (1) (step 105). The stroke setter 5, when determining that the strokes have the same width (YES in the step 105), selects maximum and minimum ones of distances between the strokes and judges whether or not a difference between the maximum and minimum distances is smaller than a predetermined threshold value '2' (step 106). The stroke setter 5, when determining the difference smaller than the threshold value (YES in the step 106), shifts its operation to the next step 107. Such judgment of whether or not the difference between the maximum and minimum distances is smaller than the threshold value is because the distance uniforming operation at the time of a too large difference results in deterioration of quality of the resultant character pattern.

After confirming that three or more stokes exist and have the same width and a difference between the maximum and minimum of the distances between the strokes is smaller than the threshold value '2' in this way, the stroke setter 5 obtains the average distance K in accordance with the above equation (2) (step 107) and then obtains the correction positions of the one-side segments of the strokes in accordance with the above equations (3), (4) and (5) (step 108). Further, the stroke setter 5 obtains the correction positions of the other-side segments of the strokes in accordance with the above equations (6), (7) and (8) (step 109).

Next, the bit map developer 6 references the respective correction positions of the pairs of opposing segments each obtained foxy each stroke, rearranges the respective control coordinate points of the outline according to the methods (A) to (C) to obtain a corrected outline, reduces the corrected outline to form a reduced outline, and then develops the reduced outline on the bit mad in the main memory 3 to form a reduced pattern (shed 109).

What is claimed is:

1. A system for processing and adjusting a pattern wherein an outline font of the pattern includes strokes which are formed by a plurality of segments each having a direction and defined by a plurality of control points, comprising:
   means for extracting a stroke group consisting of a plurality of individual strokes disposed in parallel with each other, each of the individual strokes in the stroke group being formed by a pair of consecutive segments whose directions are opposite to each other;
   means for detecting the width of each individual stroke in the stroke group from coordinate data of the control points of the pair of consecutive segments;

means for judging whether the stroke group contains a stroke-adjusting group consisting of three or more adjacent strokes whose widths are equal to each other;

means for adjusting the position of the individual strokes in the stroke-adjusting group such that distances between every two adjacent strokes in the stroke-adjusting group are made equal to each other, said position adjusting means comprising:

a) means for detecting distances between two adjacent strokes in the stroke-adjusting group from coordinate data of the control points of the segments constituting the individual strokes;

b) means for calculating the average of the distances detected by the stroke distance detecting means;

c) means for adjusting the coordinate data of the control points of the segments constituting the individual strokes in the stroke-adjusting group such that distances between two adjacent strokes become equal to the average obtained by the calculating means;

d) means for detecting maximum and minimum distances between two adjacent strokes from coordinate data of the control point of the segments constituting the individual strokes in the stroke-adjusting group;

e) means for calculating the difference between the maximum and the minimum distances; and f) means for judging whether the calculated difference between the maximum and the minimum distances is smaller than a predetermined value, wherein the coordinate data adjusting means performs the coordinate data adjusting operation only when the difference between the maximum and minimum distances is smaller than the predetermined value.

2. The system of claim 1, wherein the position adjusting means adjusts the coordinate data of a control point located within two adjacent strokes of the stroke-adjusting group such that the adjustment amount thereof becomes equal to that of the segments constituting the two adjacent strokes.

3. The system of claim 1, wherein the position adjusting means adjusts coordinate data of a control point located within a space having a width between two adjacent strokes in the stroke-adjusting group such that the distance between the control point and one of the two adjacent strokes changes in proportion to the ratio of change in the width of the space.

4. The system of claim 1, wherein the position adjusting means adjusts coordinate data of a control point located outside of the stroke-adjusting group such that the adjustment amount thereof becomes equal to that of one of the segments constituting the two adjacent strokes.

5. A system for processing and adjusting a pattern wherein an outline font of the pattern includes strokes which are formed by a plurality of segments each having a direction and defined by a plurality of control points, comprising:

means for dividing the outline font into a plurality of outline parts;

means for extracting a stroke group consisting of a plurality of individual strokes disposed in parallel with each other from each of the outline parts, each of the individual strokes in the stroke group being formed by a pair of consecutive segments whose directions are opposite to each other;

means for detecting the width of each individual stroke in the stroke group for each of the outline parts from the coordinate data of the control points of the pair of consecutive segments;

means for judging whether the stroke group for each of the outline parts contains a stroke-adjusting group consisting of three or more adjacent strokes whose widths are equal to each other;

means for adjusting the position of the individual strokes in the stroke-adjusting group such that distances between two adjacent strokes in the stroke-adjusting group for each of the outline parts are made equal to each other, said position adjusting means comprising:

a) means for detecting distances between two adjacent strokes in the stroke-adjusting group for each of the outline parts from the coordinate data of the control points of the segments constituting the individual strokes;

b) means for calculating the average of the distances detected by the stroke distance detecting means;

c) means for adjusting the coordinate data of the control points of the segments constituting the individual strokes in the stroke-adjusting group for each of the outline parts such that distances between two adjacent strokes become equal to the average obtained by calculating means;

d) means for detecting maximum and minimum distances between two adjacent strokes in the stroke-adjusting group for each of the outline parts from the coordinate data of the control point of the segments constituting the strokes;

e) means for calculating the difference between the maximum and the minimum distances; and f) means for judging whether the calculated difference between the maximum and the minimum distances is smaller than a predetermined value, wherein the coordinate data adjusting means performs the coordinate data adjusting operation only when the difference between the maximum and minimum distances is smaller than the predetermined value.

6. The system of claim 5, wherein the position adjusting means adjusts the coordinate data of a control point located within two adjacent strokes of the stroke-adjusting group for each of the outline parts such that the adjustment amount thereof becomes equal to that of the segments constituting the two adjacent strokes in the stroke-adjusting group.

7. The system of claim 5, wherein the position adjusting means adjusts coordinate data of a control point located within a space having a width between two adjacent strokes in the stroke-adjusting group for each of the outline parts such that the distance between the control point and one of the adjacent individual strokes changes in proportion to the ratio of change in the width of the space.

8. The system of claim 5, wherein the position adjusting means adjusts coordinate data of a control point located outside of the stroke-adjusting group for each of the outline parts such that the adjustment amount thereof becomes equal to that of one of the segments constituting the two adjacent strokes in the stroke-adjusting group.

* * * * *